July 23, 1929.  J. C. GABRIEL ET AL  1,722,083
ELECTRICAL CONDENSER
Filed Aug. 26, 1924  2 Sheets-Sheet 1

Inventors:
John C. Gabriel,
George M. Thurston,
by E. W. Adams Att'y

July 23, 1929.  J. C. GABRIEL ET AL  1,722,083
ELECTRICAL CONDENSER
Filed Aug. 26, 1924   2 Sheets-Sheet 2

Inventors:
John C. Gabriel,
George M. Thurston,
by ⎯⎯⎯ Atty

Patented July 23, 1929.

1,722,083

UNITED STATES PATENT OFFICE.

JOHN C. GABRIEL AND GEORGE M. THURSTON, OF NEW YORK, N. Y., ASSIGNORS TO WESTERN ELECTRIC COMPANY, INCORPORATED, OF NEW YORK, N. Y., A CORPORATION OF NEW YORK.

ELECTRICAL CONDENSER.

Application filed August 26, 1924. Serial No. 734,195.

This invention relates to electrical condensers and has for its object to provide a condenser which shall maintain a constant capacity during temperature fluctuations.

Fixed and variable air condensers to which this invention pertains have heretofore been inaccurate, varying in capacity as the temperature changes because of the natural expansion and contraction of the construction material which varies the spaced relation of the plates and consequently the condenser capacity.

According to the present invention, the inherent dimensional changes of different materials during temperature variations is utilized to compensate for any accompanying changes in the condenser capacity. More specifically, the condenser plates are of nickel and the spacers are of aluminum, it having been found that the dimensional variation of these respective metals is proportional to a constant capacity dielectric space.

Referring to the drawings in which like reference characters designate like parts in the several views.

Figure 1:
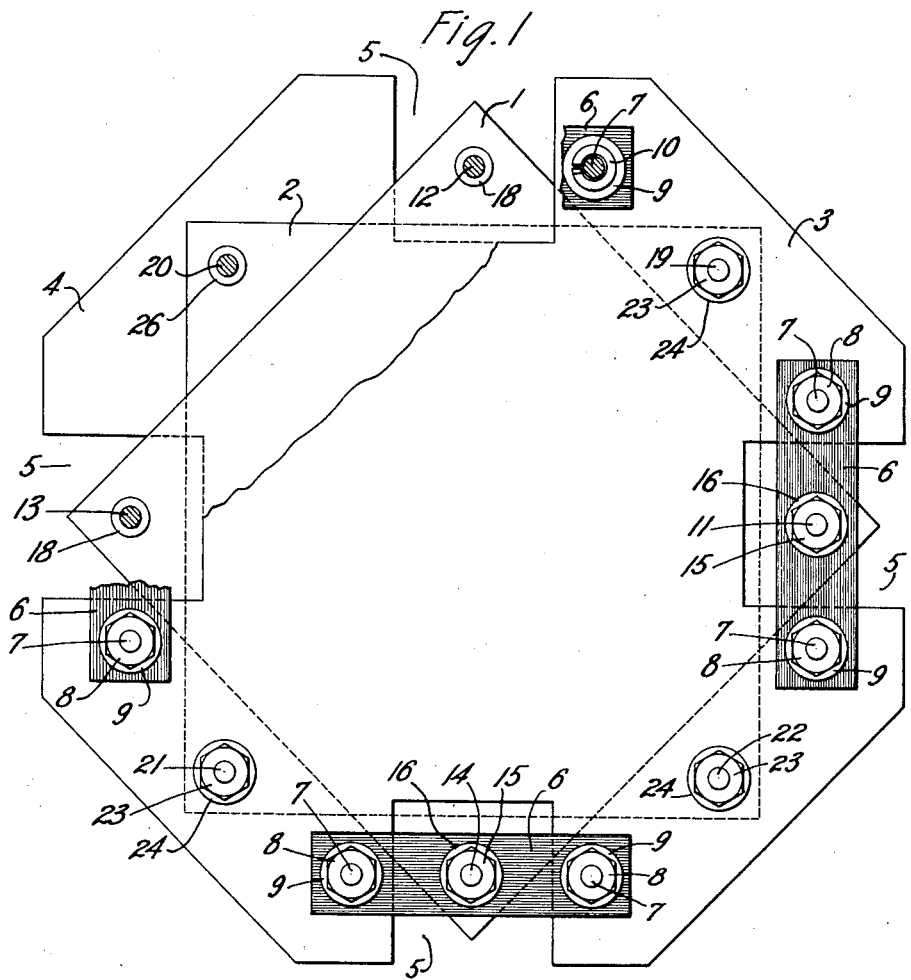
Fig. 1 is a plan view of one form of our invention as applied to fixed condensers, having a portion of one of the end plates broken away.
Figure 2:
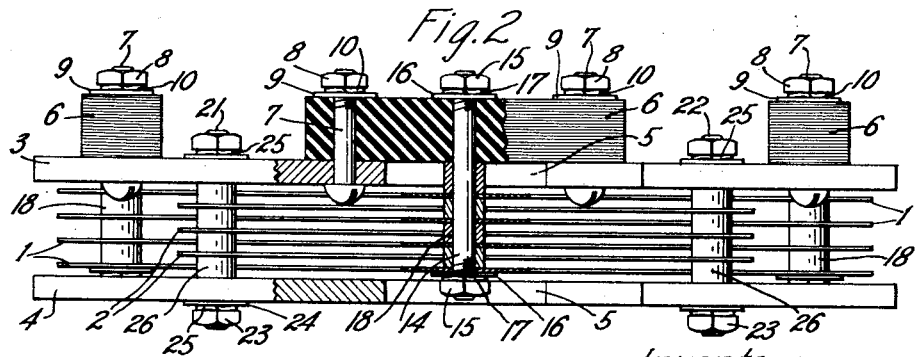
Fig. 2 is a side elevation of the same having one of the supports and insulator in partial section.

A preferred embodiment of our invention in the fixed plate type of air condenser, illustrated by Figs. 1 and 2, consists of two groups of square condenser plates 1 and 2, preferably of nickel, separately supported between two octagonal end plates 3 and 4 preferably of nickel, having rectangular slots 5 in the alternate sides. Insulators 6 bridge the slots 5 and are fastened to the end plate 3 by means of the bolts 7 and nuts 8, having ring washers 9, and lock washers 10. The insulators 6 carry the condenser plates 1 by means of the rods 11, 12, 13 and 14, preferably of aluminum, which have tightening nuts 15 and ring washers 16 and lock washers 17 at each end and carry the aluminum plate spacers 18. Condenser plates 2 are alternately and parallelly disposed between plates 1 and are directly clamped between end plates 3 and 4 by means of the aluminum rods 19, 20, 21 and 22 which have tightening nuts 23 and ring washers 24 and lock washers 25 at each end, and are disposed at an angle of 45° from the supports of plates 1. Plates 2 are separated by the spacers 26 which are the same as spacers 18.

Figure 3:
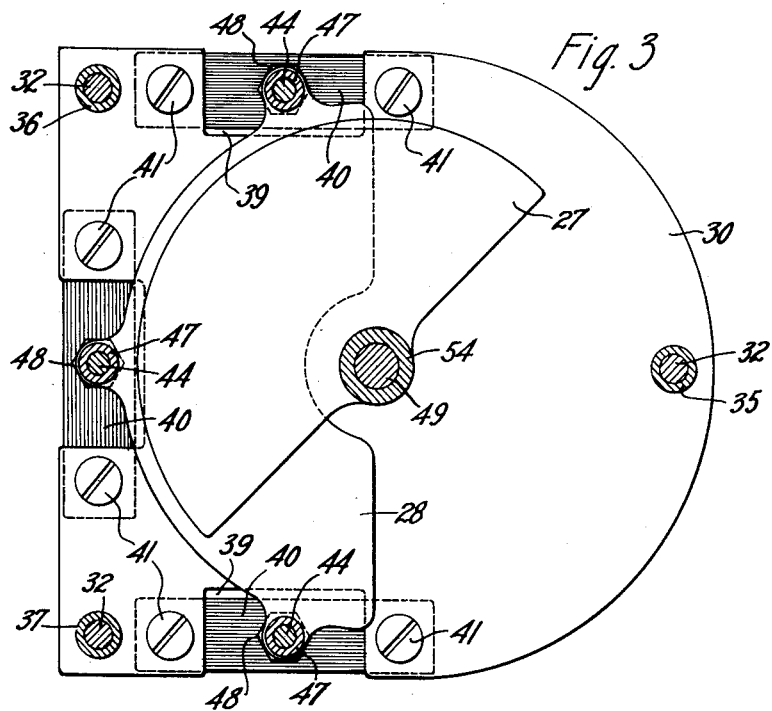
Fig. 3 is a sectional plan view of a variable condenser shown along a line of 3—3 of Fig. 4.
Figure 4:
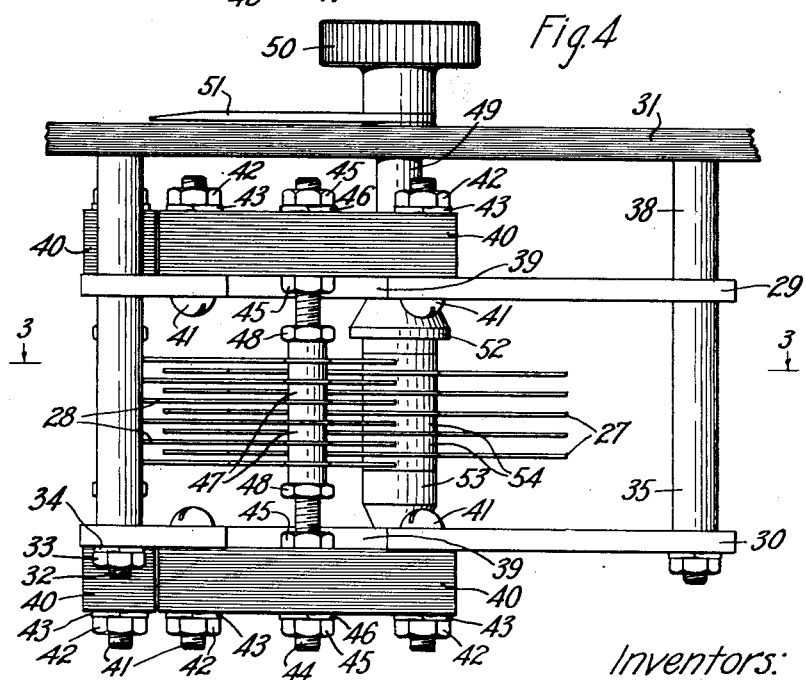
Fig. 4 is a side elevation of the same.

A modification of our invention as applied to variable air condensers is illustrated by Figs. 3 and 4, which show a common type of variable air condenser consisting in general of two groups of spaced metal plates parallelly and alternately disposed, one of the groups having a variable degree of overlap with respect to the other group, thus regulating a capacitative effect.

The semi-circular condenser plates, preferably of nickel, comprise two groups, the movable plates being designated by numeral 27 and the fixed plates by numeral 28, between which the movable plates are alternately spaced. The two end plates 29 and 30, preferably of nickel, are clamped to the panel 31 by means of the bolts 32, nuts 33 and lock washers 34, spaced by the aluminum tubes 35, 36 and 37 and separated from the panel 31 by means of the tubes of insulating material 38. The end plates 29 and 30 have rectangular slots and the sides of 39 which are bridged by the insulators 40 fastened to the plates 29 and 30 by means of the bolts 41 and nuts 42 over the lock washers 43. The fixed condenser plates 28 are suspended on the three threaded rods 44 which are clamped through the centers of the insulators 40 between the nuts 45, the exterior nuts each being on the lock washers 46. The stationary plates 28 are separated by the aluminum spacers 47 which are clamped between the nuts 48.

The axis 49 is rotatable by the knob 50 having a nickel indicator pointer 51 which plays over the dial on the face of the panel 31. The axis 49 is suspended designating the end plates 29 and 30 upon the bearing cones 52 and 53, preferably of aluminum, which clamp the plates 27 and the plate spacers 54, which are of the same material and thickness as spacers 47.

The spring lock washers are inserted under each exterior nut in both the fixed and variable types of condensers, as they are sufficiently resilient to take up the expansion and contraction of the insulators, and the unequal mechanical strains caused by such expansion and contraction in the other parts.

It has been calculated that the coefficient of total change in capacity due to the expansion of the plates and spacers made of different materials is:

$$2A_p - \frac{SA_s - PA_p}{S - P}$$

in which $A_p$ is the coefficient of linear expansion for the plates, $A_s$ is the coefficient of linear expansion for the spacers, $P$ is the thickness of the plates, and $S$ is the thickness of the spacers. In order to make the plates and spacers of the proper thickness to give constant capacity for the metals chosen, the following ratio must hold:

$$\frac{A_s}{A_p} = 2 - \frac{P}{S}$$

These equations illustrate the principles of our invention in which the inherent expansion and contraction of metals is utilized to compensate for the variations in condenser capacity caused by temperature fluctuation, and thus a constant capacity is maintained by utilizing one of the common factors of error in condensers to compensate for that error.

When the temperature of a condenser rises, the thickness and area of the plates increase, also the distance between the plates changes due to the expansion or contraction of the spacers, thereby effecting a change in the capacity of the condenser. In the condenser herein described this change of capacity, due to the expanding and contracting of the metals due to temperature changes, is compensated for by the use of plates and spacers having the proper relative coefficient of expansion. Due to this construction a condenser may be made which will have either a negative or positive change, or no change at all when the temperature rises.

What is claimed is:

1. An electrical air condenser comprising two groups of nickel condenser plates separated by aluminum spacers, each condenser plate of one group alternately disposed with respect to the condenser plates of the other group, each of said groups separately supported between common end plates, and said condenser plates and spacers inherently co-operating to compensate for capacity variations due to thermal expansion and contraction.

2. An electrical air condenser comprising nickel condenser plates and aluminum separators, said condenser plates parallelly arranged in groups, each of said groups separately supported between common end plates, and each of said condenser plates of each group alternately disposed with respect to the condenser plates of each other group, the inherent expansion and contraction of said condenser plates and separators compensating for temperature variations to maintain fixed condenser capacity at different temperatures.

3. An electrical condenser comprising a plurality of groups of metal plates, each of said plates of one group alternately disposed with those of another, and a plurality of metal spacers separating said plates, said spacers consisting of a metal whose coefficient of expansion is different from that of the metal used in said plates in order to maintain a constant capacity during temperature changes.

4. An electrical condenser comprising parallel metal plates, and a plurality of metal washers for separating said plates, the material of said washers having a different coefficient of expansion from that of said plates in order to compensate for changes in capacity due to thermal expansion and contraction of said materials.

In witness whereof, we hereunto subscribe our names this 25th day of August A. D., 1924.

JOHN C. GABRIEL.
GEORGE M. THURSTON.